(12) United States Patent
Klee et al.

(10) Patent No.: US 9,983,090 B2
(45) Date of Patent: May 29, 2018

(54) TANK LEAKAGE DIAGNOSIS HAVING A FUEL TANK AS A PRESSURE STORE

(71) Applicant: Robert Bosch GmbH, Stuttgart (DE)

(72) Inventors: Peter Klee, Knittlingen (DE); Andreas Posselt, Muehlacker (DE); Marko Lorenz, Grossbottwar (DE); Andreas Gutscher, Markgroeningen (DE); Roland Kurz, Leonberg (DE); Thomas Wieczorek, Remseck (DE); Thomas Herges, Eberdingen (DE); Joerg Koenig, Stuttgart (DE); Florian Guenther, Schwieberdingen (DE); Johannes Hoegl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 15/032,107

(22) PCT Filed: Sep. 25, 2014

(86) PCT No.: PCT/EP2014/070491
§ 371 (c)(1),
(2) Date: Apr. 26, 2016

(87) PCT Pub. No.: WO2015/062792
PCT Pub. Date: Mar. 7, 2015

(65) Prior Publication Data
US 2016/0266003 A1     Sep. 15, 2016

(30) Foreign Application Priority Data
Oct. 28, 2013   (DE) ................. 10 2013 221 794

(51) Int. Cl.
*G01M 3/26*   (2006.01)
*G01M 3/32*   (2006.01)
(Continued)

(52) U.S. Cl.
CPC ............ *G01M 3/26* (2013.01); *F02D 41/22* (2013.01); *F02M 25/0809* (2013.01);
(Continued)

(58) Field of Classification Search
CPC ....... F02D 2041/225; F02D 2200/0602; F02D 33/003; F02D 41/0007; F02D 41/22;
(Continued)

(56) References Cited

U.S. PATENT DOCUMENTS

| 5,511,529 A * | 4/1996 | Blumenstock ......... F02M 25/08 123/516 |
| 2005/0133097 A1 | 6/2005 | Mitani et al. |

(Continued)

FOREIGN PATENT DOCUMENTS

| DE | 4124465 | 1/1993 |
| DE | 4312720 | 10/1994 |

(Continued)

OTHER PUBLICATIONS

International Search Report for Application No. PCT/EP2014/070491 dated Nov. 10, 2014 (English Translation, 3 pages).

*Primary Examiner* — Nguyen Ha
(74) *Attorney, Agent, or Firm* — Michael Best & Friedrich LLP

(57) ABSTRACT

The invention relates to a system (1) and to a corresponding method for tank leakage diagnosis. The system (1) comprises a fuel tank (3), a pressure source (5, 9), and a pressure sensor (7). The pressure source (5, 9) is configured to increase the pressure in the fuel tank (3). The pressure sensor (7) is configured to detect the pressure progression at the fuel tank (3). The system (1) is configured to seal the fuel tank (3) in a gas-tight manner such that the fuel tank (3) can be used as a pressure store. Furthermore, the system (1) is configured to conclude, independently of a current operation (Continued)

of the pressure source (5, 9) based on the determined pressure progression at the fuel tank (3), that a leak is present.

13 Claims, 2 Drawing Sheets

(51) Int. Cl.
*F02D 41/22* (2006.01)
*F02M 25/08* (2006.01)
*F02M 33/02* (2006.01)
F02D 33/00 (2006.01)
F02D 41/00 (2006.01)

(52) U.S. Cl.
CPC ...... *F02M 25/089* (2013.01); *F02M 25/0818* (2013.01); *F02M 25/0836* (2013.01); *F02D 33/003* (2013.01); *F02D 41/0007* (2013.01); *F02D 2041/225* (2013.01); *F02D 2200/0602* (2013.01); *Y02T 10/40* (2013.01)

(58) Field of Classification Search
CPC ............... F02M 25/08; F02M 25/0809; F02M 25/0818; F02M 25/0836; F02M 25/089; F02M 33/02; G01M 3/26; G01M 3/32; Y02T 10/40
See application file for complete search history.

(56) References Cited

U.S. PATENT DOCUMENTS

2006/0031000 A1 2/2006 Amano et al.
2011/0295482 A1 12/2011 Pearce et al.

FOREIGN PATENT DOCUMENTS

| | | |
|---|---|---|
| DE | 4335126 | 4/1995 |
| DE | 10133823 | 2/2003 |
| DE | 10133826 | 2/2003 |
| DE | 19636431 | 5/2009 |
| DE | 102011086955 | 2/2013 |
| WO | 2012089433 | 7/2012 |
| WO | 2013020824 | 2/2013 |

\* cited by examiner

TANK LEAKAGE DIAGNOSIS HAVING A FUEL TANK AS A PRESSURE STORE

BACKGROUND OF THE INVENTION

Systems for checking the operability and seal tightness of fuel tank systems are required by law in some countries and are, for example, known from the German patent specifications DE 101 33 823 C2 and DE 196 36 431 B4. In the case of a tank leakage diagnostic module (diagnosis module tank leakage, DMTL), the fuel tank or the subspace to be checked can, for example, be pumped up with gas or a gas mixture using an electric air pump. A current profile of the air pump is ascertained and evaluated. A leakage can be suggested from this current profile.

In this procedure, a reference opening and a 3/2 directional control valve can be used. The 3/2 directional control valve is initially switched in such a manner that the air pump delivers air across the defined reference opening. Said 3/2 directional control valve is subsequently switched in such a manner that the air pump delivers air into the fuel tank. If, in so doing, the air pump builds up the same or a higher pressure than across the reference opening, the current consumption of the air pump is also the same or higher than when pumping across the reference opening. In this case, the conclusion can be drawn that a substantial leak is not present at the fuel tank or respectively at the subspace to be checked. If, on the other hand, the air pump achieves a lower current value than when pumping across the reference opening, a leakage in the space being checked can be inferred which is greater in size than the reference opening.

Such a tank leakage diagnosis is usually performed in the after-run period, i.e. after turning off the vehicle. To this end, the control device of the vehicle must also continue to operate after the vehicle has been turned off. This leads to a load on the onboard power system. Different effects on the air pump can furthermore influence the current profile ascertained. In certain circumstances, this can lead to a faulty diagnosis.

An alternative known method for tank leakage diagnosis is based on the evaluation of the outgassing behavior of the fuel in the fuel tank. In this method, an interpretation of the measurement results can also be affected by outside influences. For example, a swashing of the fuel in the fuel tank and a strong outgassing can lead to a faulty diagnosis.

SUMMARY OF THE INVENTION

A need for an improved system for tank leakage diagnosis and a corresponding improved method for diagnosis therefore exist, which particularly facilitate a more reliable detection of a leakage and, as the case may be, are more energy efficient.

Features, details and possible advantages of a device pursuant to embodiments of the invention are discussed below in detail.

According to a first aspect of the invention, a system for tank leakage diagnosis is presented. The system comprises a fuel tank, a pressure source and a pressure sensor. The pressure source is configured to increase the pressure in the fuel tank. The pressure sensor is configured to detect the pressure progression at the fuel tank. The system is thereby configured to seal the fuel tank in a gas-tight manner such that the fuel tank can be used as a pressure store. Furthermore, the system is configured to conclude, independently of a current operation of the pressure source, based on the determined pressure progression at the fuel tank, that a leak is present.

In other words, the concept of the present invention is based on using the fuel tank as a pressure store and thereby temporally decoupling the tank leakage diagnosis from the operation of the pressure source. In this way, the tank leakage diagnosis at the fuel tank can take place over an extended period of time, for example for several hours, after a one-time pressurization. If the overpressure does not slowly decrease, the test space, i.e. the fuel tank and the corresponding supply lines up to the closed valves, is leakproof. If, on the other hand, the overpressure decreases quickly, it can be concluded that a leak is present. Furthermore, the overpressure stored in the fuel tank can be fed to further test spaces, such as, for example, to an adsorption filter connected to the fuel tank. In this way, the seal tightness of further test spaces can be tested.

When using the fuel tank as a pressure store, a tank leakage diagnosis is advantageously possible at any desired point in time after completing pressurization. In the system according to the invention, a tank leak diagnosis after the vehicle has been shut down can be eliminated. In this way, there is no additional load placed on the onboard power system and energy can be saved. If the engine has been shut down over night, it can particularly be inferred that no leak is present in the fuel tank if the pressure is still present when the motor vehicle is started in the morning. A further advantage of the system according to the invention can be seen therein that an outgassing of the fuel in the fuel tank is reduced due to the stored overpressure. This in turn facilitates being able to flush the adsorption filter at a lower rate.

The system can, for example, be used in motor vehicles with an internal combustion engine. The system can particularly be used in a supercharged vehicle or respectively in a vehicle comprising a turbocharger.

The pressure source can, for example be an air pump or preferably a turbocharger. The pressure source increases the pressure or respectively generates an overpressure in the fuel tank by supplying or pumping in a gas or gas mixture. The gas or gas mixture can, for example, be air. The pressure source can be connected to the fuel tank via a first line and can, for example, be separated from the fuel tank in a gas-tight manner by means of a valve.

The pressure sensor can be arranged on the subspace to be checked. The pressure sensor can, for example, be disposed directly on the fuel tank. Alternatively, the pressure sensor can if required be connected to the fuel tank via a line. The pressure sensor can be designed as a piezoresistive sensor, a strain gauge or as a micromechanical pressure sensor comprising evaluation electronics. The pressure sensor can particularly be functionally connected to the control device of the motor vehicle, and the measured values, i.e. the detected pressure progression, can be transmitted to the control device.

The system stores the overpressure generated by the pressure source in the fuel tank by means of a gas-tight sealing of the fuel tank. This can be implemented by means of corresponding valves at the inlets and outlets of the fuel tank. If the overpressure has been generated, it can be stored for any length of time, for example hours or even days. That means that a tank leakage diagnosis can take place temporally independently of a pumping-in of gas by the pressure source.

On the basis of the pressure progression detected by the pressure sensor, the system can detect a leakage in the system, in particular in the fuel tank. If, when the valves are closed in a gas-tight manner, the pressure remains substantially unchanged, for example, over a period of time of 30 minutes or if the vehicle is shut down over night, the system is then free of leaks. If, however, the pressure drops notably, a leak can then be detected and a corresponding signal can be transmitted to the control device and if need be to the driver of the motor vehicle.

According to one exemplary embodiment of the invention, the pressure source is designed as a turbocharger. The turbocharger is disposed on the intake manifold of the motor vehicle and is used to increase the power and efficiency of the internal combustion engine. To this end, the turbocharger compresses the combustion air and directs it to the cylinders of the internal combustion engine. The excess air not required by the combustion engine can be supplied to the fuel tank via a line and be stored as overpressure.

According to a further exemplary embodiment of the invention, the fuel tank can be connected to the pressure source via a first line. To this end, an electric valve is provided on the first line. If the first electric valve is open, the pressure source is connected to the fuel tank. The system furthermore comprises an adsorption filter. The adsorption filter can be connected to the fuel tank via a second line. To this end, a second electric valve is provided on the second line. If the second electric valve is open, the adsorption filter is then connected to the fuel tank. When detecting a pressure progression at the fuel tank, the first valve and the second valve seal the fuel tank in a gas-tight manner.

The first and the second valve are designed as shut-off valves (SOV). The shut-off valve can control the flow rate of a fluid, in particular a gas, through the respective line. The flow of fluid is prevented in a closed position of the shut-off valve and allowed in an open position. The first and the second electric valves are closed when currentless and have, for example, to be electrically actuated to open via the control device.

The adsorption filter can, for example, be designed as an activated carbon filter (ACF). The fuel tank must be connected to the surrounding environment on account of temperature changes and outgassing fuel. In so doing, fuel-loaded gases may however not escape from the motor vehicle, or respectively the threshold value of the fuel-load pollution is controlled by law in the individual countries. Fuel outgassing from the fuel tank is filtered out and stored in the ACF. The ACF can furthermore be regenerated by being flushed with fresh air if fresh air is drawn from the surrounding environment through the ACF to the internal combustion engine or respectively to the intake manifold.

The exemplary embodiments described above make a tank leakage diagnosis possible in the region of the fuel tank. The described system furthermore makes it possible to carry out a tank leakage diagnosis at other test spaces or subspaces of the motor vehicle.

According to a further exemplary embodiment of the invention, the adsorption filter can be connected to a surrounding environment via a fourth line. To this end, a third electric valve is provided on the fourth line. If the third electric valve is open, the adsorption filter is then connected to the surrounding environment, in particular to a fresh air environment. The adsorption filter can furthermore be connected to an intake manifold via a fifth line in order to be flushed with fresh air. A fourth electric valve is provided on the fifth line. When detecting a pressure progression at the adsorption filter, the second electric valve is open, whereas the first valve, the third valve and the fourth valve are closed in a gas-tight manner. The third electric valve can thus be open when currentless and has to be actuated by the control device in order to close.

In this way, the subspace checked for leakage can be expanded around the region of the adsorption filter. If overpressure is initially stored in the fuel tank, a tank leakage diagnosis can already be carried out at the fuel tank. If the third valve and the fourth valve are now additionally closed in a gas-tight manner, a further test space emerges which comprises the adsorption filter. If now the second valve is subsequently opened, the gas flows from the fuel tank to the adsorption filter. The pressure progression can now be detected by means of the pressure sensor in the fuel tank and inferences with regard to leakage can be drawn from said pressure progression. A further pressure sensor can alternatively be provided in the region of the adsorption filter. In this case, the second electric valve can be opened only for a short time and subsequently closed again. This can, for example, occur when stopped at a stoplight or during after-run.

The third electric valve is, similarly to the first and second electric valve, designed as a shut-off valve. The fourth electric valve can also be referred to as a tank vent valve (TVV). The fourth electric valve is likewise designed as a shut-off valve.

The arrangement of the lines described above, in particular of the first and the second line, can vary. An alternative arrangement of these lines is described below by way of example.

According to a further exemplary embodiment of the invention, the system comprises an adsorption filter, to which the pressure source can be connected via a first line. To this end a first electric valve is provided on the first line. The fuel tank can furthermore be connected via a second line to the adsorption filter. A second electric valve is provided on the second line for this purpose. The second valve seals the fuel tank in a gas-tight manner when detecting a pressure progression at said fuel tank. In so doing, the second valve can be closed without current and be opened when actuated by the control device.

This exemplary embodiment is similar to the exemplary embodiment described above; however, the course of the lines is different. In this case, the fuel tank can be connected to the pressure source via a first line, a second line and the adsorption filter. In order to generate an overpressure in the fuel tank, the first as well as the second electric valve has to be open. In order to detect a pressure progression at the fuel tank and to carry out a tank leakage diagnosis, only the second electric valve must be closed. Furthermore, the number of required shut-off valves can be reduced in comparison to the exemplary embodiments mentioned above due to such a design.

According to a further exemplary embodiment of the invention, the fuel tank can be connected to the adsorption filter via a third line. A first pressure relief valve (PRV) is provided on the third line, said pressure relief valve being designed to open in the direction of the adsorption filter as soon as a predefinable pressure threshold value in the fuel tank has been exceeded. In this way, too high pressures, e.g. as a result of outgassing of fuel, can be prevented. The pressure threshold value can, for example, lie at approximately 50 mbar. The pressure relief valve can also be referred to as an overpressure valve and in this sense limits the maximum pneumatic pressure in the fuel tank.

According to a further exemplary embodiment of the invention, the adsorption filter can be connected via a fourth line to a surrounding environment. To this end, a directional control valve is provided between the first line, the fourth line and the adsorption filter. In a first position, the directional control valve is designed to connect the adsorption filter to the first line. In a second position, the directional control valve is designed to connect the adsorption filter to the fourth line. The directional control valve can thereby be designed, e.g., as a 3/2 directional control valve. Due to such a design, a flushing rate of the adsorption filter with fresh air can be increased.

According to a further exemplary embodiment of the invention, the adsorption filter can be connected via a fifth line to an intake manifold for the purpose of flushing said filter with fresh air. In so doing, a fourth electric valve is provided on the fifth line. As described above, the fourth electric valve can be designed as a tank vent valve (TVV). When detecting a pressure progression at the adsorption filter, the second electric valve is open, whereas the first and the fourth electric valves are closed in a gas-tight manner and the directional control valve is set in the first position.

According to a further exemplary embodiment of the invention, the adsorption filter can be connected via a sixth line to the intake manifold for the purpose of flushing said filter with fresh air. In this case, a second pressure relief valve is provided on the sixth line. The second pressure relief valve is designed to open in the direction of the intake manifold as soon as a predefinable pressure threshold value has been exceeded at the adsorption filter. In addition, a second or respectively further pressure sensor can be provided on the sixth line. The pressure threshold value can, for example, lie at approximately 50 mbar. In this way, too high pressures at the adsorption filter can be prevented.

A second aspect of the invention relates to a method for carrying out a tank leakage diagnosis with a system described above. The method comprises the following steps: connecting a fuel tank to a pressure source; increasing the pressure in the fuel tank by means of the pressure source; sealing the fuel tank in a gas-tight manner and using the fuel tank as a pressure store; determining a presence of a leak independently of a current operation of the pressure source and based on the determined pressure progression at the fuel tank.

BRIEF DESCRIPTION OF THE DRAWINGS

Further features and advantages of the present invention will become apparent to the person skilled in the art from the following description of exemplary embodiments, which are not to be interpreted so as to limit the invention, with reference to the attached drawings. In the drawings.

All of the figures are only schematic depictions of inventive devices or components thereof according to exemplary embodiments of the invention. Spacings and size relations are not depicted true to scale in the figures. In the different figures, corresponding elements are provided with the same reference numbers.

DETAILED DESCRIPTION

Figure 1:
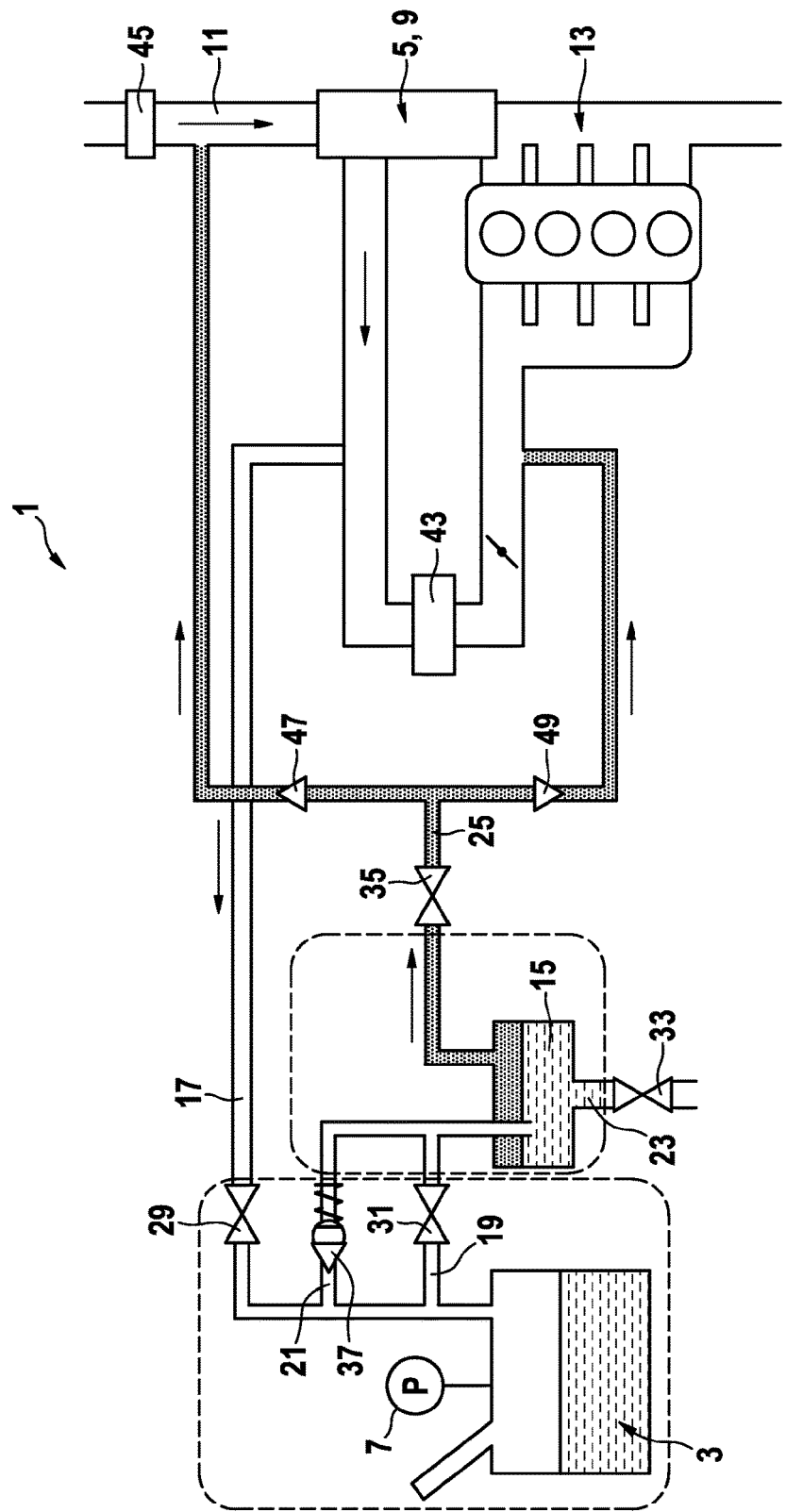
FIG. 1 shows a system for tank leakage diagnosis according to a first exemplary embodiment of the invention.

In FIG. 1, a first exemplary of the system 1 for tank diagnosis is depicted. The system 1 comprises a fuel tank 3, a pressure source 5 and a pressure sensor 7. The pressure source 5 is designed as a turbocharger 9 in the exemplary embodiments shown. The turbocharger 9 is disposed on the intake manifold 11 and compresses the air which is supplied to an internal combustion engine 13. The pressure source 5 could, for example, alternatively be designed as an air pump.

The pressure source 5, 9 can increase the pressure in the fuel tank 3 via the first line 17, if a first electric valve 29 that is disposed on the first line 17 is in an open position. The pressure sensor 7 detects the pressure progression at the fuel tank 3 and transmits the measured values, for example, to a control device. In order to carry out the tank leakage diagnosis, the system 1 is configured to seal all supply and discharge lines of the fuel tank 3 in such a manner that the fuel tank 3 can be used as a pressure store. The system 1 is furthermore configured to conclude, independently of a current operation of the pressure source 5, 9 based on the determined pressure progression at the fuel tank 3, that a leak is present. That means that an overpressure is initially stored in the fuel tank 3 and subsequently all of the shut-off valves on supply and discharge lines of the fuel tank 3 are sealed in a gas-tight manner. If the pressure sensor 7 thereupon detects a substantially constant pressure progression, it can then be concluded that a leak is not present at the fuel tank 3. If, on the other hand, the pressure drops considerably, it can then be concluded that a leak is present.

The subspace checked in the process is indicated by dashed lines on the left in FIG. 1. The subspace in which the check takes place comprises, for example, the fuel tank 3 and the lines 17, 19, 21 up to the valves 29, 31, 37.

In addition, the tank leakage diagnosis can be expanded to a further subspace of the system 1. This is likewise indicated with a dashed line in FIG. 1 and comprises an adsorption filter 15. The adsorption filter 15 can be connected via a second line 19 to the fuel tank 3 if the electric valve 31 provided on the second line 19 is in an open position. The adsorption filter 15 can furthermore be connected via a fourth line to a surrounding environment if a third electric valve 33 is in an open position. In addition, the adsorption filter 15 can be connected via a fifth line 25 to the intake manifold 11 in order to be flushed with fresh air if a fourth electric valve 35 is in an open position.

When detecting a pressure progression at the fuel tank 3, i.e. for conducting the tank leak diagnosis in the first subspace, the first valve 29 and the second valve 31 are closed in a gas-tight manner. When detecting a pressure progression at the adsorption filter 15, i.e. for conducting the tank leakage diagnosis in the second subspace, the second electric valve 31 is opened, whereas the first electric valve 29, the third electric valve 33 and the fourth electric valve 35 are closed in a gas-tight manner.

When using the fuel tank 3 as a pressure store, a tank leak diagnosis is advantageously possible at any point in time after completing the pressurization. In so doing, a tank leakage diagnosis in the after-run period can be omitted; thus enabling energy to be saved. A further advantage can be seen therein that an outgassing of the fuel in the fuel tank 3 is reduced due to the stored overpressure. This in turn makes a lower flush rate of the adsorption filter 15 possible.

In order to prevent the overpressure in the fuel tank 3 from becoming too large, a third line 21 is provided which connects the fuel tank 3 to the adsorption filter 15. A first pressure relief valve 37 is provided on the third line 21 which is designed to open in the direction of the adsorption filter 15 as soon as a predefinable pressure threshold value has been exceeded in the fuel tank 3.

As a further component of the system 1, a charge air cooler 43 can be provided at a channel area between turbocharger 9 and internal combustion engine 13. Furthermore, an air-flow sensor 45, in particular a hot-film air-flow sensor (HFS), can be provided at the intake manifold 11. In addition, the fifth line 25 extending between the adsorption filter 15 and the intake manifold 11 can branch off. A first section of the fifth line 25 then extends directly to the intake manifold 11. A second section of the fifth line 25 is connected to the channel area between turbocharger 9 internal combustion engine 13. In this way, fuel vapors 15 flushed from the adsorption filter 15 can be directly fed to the internal combustion engine. In addition, a first check valve 47 can be provided in the first section of the fifth line 25 and a second check valve 49 in the second section of the fifth line 25. The check valves 47, 49 can prevent gases from flowing back to the adsorption filter 15. For example, the first line 17 is flow-connected to a line section between the turbocharger 9 and the charge air filter 43.

Figure 2:
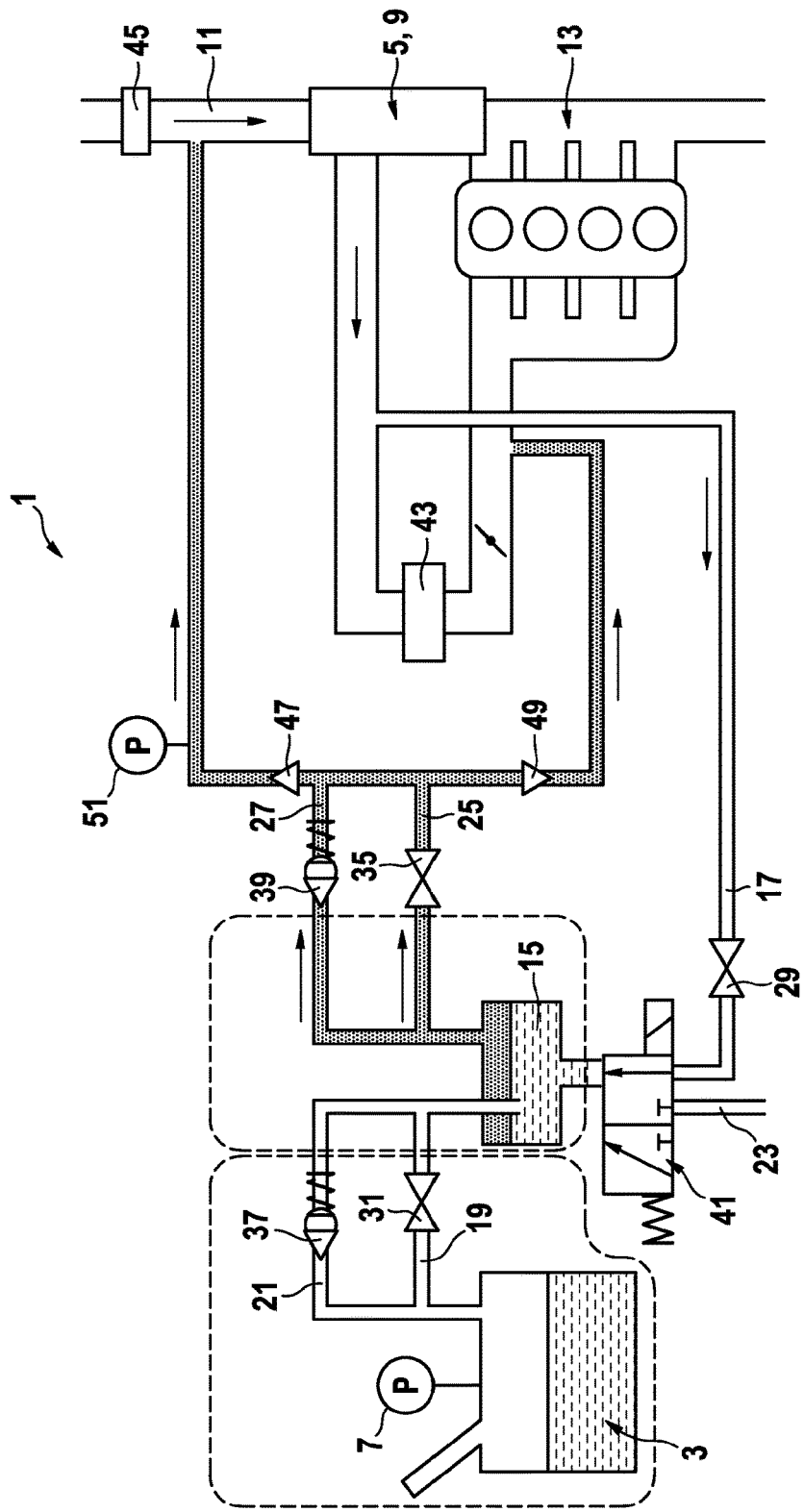
FIG. 2 shows a system for tank leakage diagnosis according to a second exemplary embodiment of the invention.

A second exemplary embodiment of the system 1 for tank leakage diagnosis is depicted in FIG. 2. The system 1 is constructed similarly to the system 1 depicted in FIG. 1. In contrast to the system 1 of FIG. 1, the lines 17, 19, 27 in the system 1 depicted in FIG. 2 are arranged or configured differently. In this case, the fuel tank 3 cannot be directly connected to the pressure source 5, 9 via the first line 17 but can be connected to said pressure source via the combination of second line 19, adsorption filter 15 and first line 17. To this end, the first line 17, for example originating from the line section between the turbocharger 9 and the charge air cooler 43, is flow-connected directly to the adsorption filter 15. In order to generate an overpressure in the fuel tank 3, the first electric valve 29 as well as the second electric valve 31 has to be open. In order to detect a pressure progression at the fuel tank 3 and to carry out a tank leakage diagnosis, only the second electric valve 31 has to be closed. Hence, the number of shut-off valves required for the tank leakage diagnosis can be reduced in comparison to the exemplary embodiment in FIG. 1.

A directional control valve 41 is furthermore provided in FIG. 2 between the first line 17, the fourth line 23 and the adsorption filter 15. In a first position, the directional control valve 41 connects the adsorption filter 15 to the first line 17. In a second position, the directional control valve 41 connects the adsorption filter 15 to the fourth line 23. When detecting a pressure progression at the adsorption filter 15, i.e. in the second subspace of the system 1, the second electric valve 31 is open, whereas the first electric valve 29 and the fourth electric valve 35 are closed in a gas-tight manner and the directional control valve 41 is disposed in the first position.

A sixth line 27 is furthermore provided in the exemplary embodiment of FIG. 2, which connects the adsorption filter 15 to the intake manifold 11 for flushing with fresh air. A second pressure relief valve 39 is provided on the sixth line 27, said pressure relief valve preventing the pressure in the region of the adsorption filter 15 from increasing too much. To this end, the second pressure relief valve 39 is configured to open in the direction of the intake manifold 11 as soon as a predefinable pressure threshold value has been exceeded at the adsorption filter 15. In addition, a further pressure sensor 51 is provided in a channel area between intake manifold 11 and adsorption filter 15. The further pressure sensor 51 can be configured to carry out a component test, i.e. to, e.g., detect the switching of the tank vent valves 35.

In closing, it is noted that expressions such as "comprising" or something similar do not exclude other elements or steps from being provided. In addition, it should be noted that "a" or "one" do not exclude a plurality. Furthermore, features described in connection with the different embodiments can be combined with each other in an arbitrary fashion. It is further noted that the reference signs in the claims are not to be interpreted so as to limit the scope of the claims.

What is claimed is:

1. A system for tank leakage diagnosis, the system comprising:
   a fuel tank;
   a pressure source, which is configured to increase a pressure in the fuel tank; and
   a pressure sensor, which is configured to detect a pressure progression at the fuel tank,
   wherein the system is configured to seal the fuel tank in a gas-tight manner such that the fuel tank can be used as a pressure store, wherein
   the system is configured to conclude, independently of a current operation of the pressure source, based on a detected pressure progression at the fuel tank, that a leak is present,
   wherein the fuel tank is configured to be connected to the pressure source via a first line,
   wherein a first electric valve is provided on the first line,
   wherein the system further comprises an adsorption filter,
   wherein the fuel tank is configured to be connected to the adsorption filter via a second line,
   wherein a second electric valve is provided on the second line, and
   wherein, when detecting a pressure progression at the fuel tank, the first valve and the second valve seal the fuel tank in a gas-tight manner.

2. The system according to claim 1, wherein the pressure source is a turbocharger.

3. The system according to claim 1,
   wherein the adsorption filter is configured to be connected to a surrounding environment via a fourth line;
   wherein a third electric valve is provided on the fourth line;
   wherein the adsorption filter is configured to be connected via a fifth line to an intake manifold in order to be flushed with fresh air;
   wherein a fourth electric valve is provided on the fifth line; and
   wherein, when detecting a pressure progression at the adsorption filter, the second electric valve is open, whereas the first electric valve, the third electric valve and the fourth electric valve are closed in a gas-tight manner.

4. The system according to claim 1,
   wherein the fuel tank is configured to be connected to the adsorption filter via a third line;
   wherein a first pressure relief valve is provided on the third line; and
   wherein the first pressure relief valve is designed to open in the direction of the adsorption filter as soon as a predefinable pressure threshold value has been exceeded in the fuel tank.

5. The system according to claim 1, further comprising:
   an adsorption filter;
   wherein the pressure source is configured to be connected to the adsorption filter via a first line;
   wherein a first electric valve is provided on the first line;
   wherein the fuel tank is configured to be connected to the adsorption filter via a second line;
   wherein a second electric valve is provided on the second line; and
   wherein, when detecting a pressure progression at the fuel tank, the second valve seals the fuel tank in a gas-tight manner.

6. The system according to claim 5,
wherein the adsorption filter is configured to be connected to a surrounding environment via a fourth line;
wherein a directional control valve is provided between the first line, the fourth line and the adsorption filter;
wherein the directional control valve is configured in a first position to connect the adsorption filter to the first line; and
wherein the directional control valve is configured in a second position to connect the adsorption filter to the fourth line.

7. The system according to claim 6,
wherein the adsorption filter is configured to be connected to an intake manifold via a fifth line in order to be flushed with fresh air;
wherein a fourth electric valve is provided on the fifth line; and
wherein, when detecting a pressure progression at the adsorption filter, the second electric valve is open, whereas the first electric valve and the fourth electric valve are closed in a gas-tight manner and the directional control valve is disposed in the first position.

8. The system according to claim 7,
wherein the adsorption filter is configured to be connected to the intake manifold via a sixth line in order to be flushed with fresh air;
wherein a second pressure relief valve is provided on the sixth line; and
wherein the second pressure relief valve is designed to open in the direction of the intake manifold as soon as a predefinable pressure threshold value at the adsorption filter has been exceeded.

9. A method for carrying out a tank leakage diagnosis on a system according to claim 1, the method comprising the following steps:
connecting the fuel tank to the pressure source;
increasing the pressure in the fuel tank by means of the pressure source;
sealing the fuel tank in a gas-tight manner;
using the fuel tank as a pressure store; and
detecting a presence of a leak independently of the current operation of the pressure source and based on a detected pressure progression at the fuel tank.

10. A system for tank leakage diagnosis, the system comprising:
a fuel tank;
a pressure source, which is configured to increase a pressure in the fuel tank; a pressure sensor, which is configured to detect a pressure progression at the fuel tank; and
an adsorption filter,
wherein the pressure source is configured to be connected to the adsorption filter via a first line,
wherein a first electric valve is provided on the first line,
wherein the fuel tank is configured to be connected to the adsorption filter via a second line,
wherein a second electric valve is provided on the second line,
wherein, when detecting a pressure progression at the fuel tank, the second valve seals the fuel tank in a gas-tight manner,
wherein the fuel tank is configured to be connected to the adsorption filter via a third line,
wherein a first pressure relief valve is provided on the third line, and
wherein the first pressure relief valve is designed to open in the direction of the adsorption filter as soon as a predefinable pressure threshold value has been exceeded in the fuel tank.

11. A method for carrying out a leakage diagnosis on a portion of a fuel system, the method comprising the following steps:
communicating a fuel tank with a pressure source;
increasing a pressure in the fuel tank by means of the pressure source;
sealing the fuel tank in a gas-tight manner;
detecting a presence of a leak independently of a current operation of the pressure source and based on a determined pressure progression at the fuel tank;
after the detecting, opening a valve connecting the fuel tank with an adsorption filter; and
after the opening, detecting a presence of a leak independently of a current operation of the pressure source and based on a determined pressure progression at either 1) a space including both the fuel tank and the adsorption filter or 2) the adsorption filter only.

12. The method of claim 11, wherein detecting a presence of a leak independently of the current operation of the pressure source and based on a determined pressure progression at a space including both the fuel tank and the adsorption filter includes detecting with a pressure sensor positioned in the fuel tank.

13. The method of claim 11, wherein detecting a presence of a leak independently of the current operation of the pressure source and based on a determined pressure progression at a space including both the fuel tank and the adsorption filter includes detecting with a pressure sensor positioned in the adsorption filter.

\* \* \* \* \*